US009643277B2

(12) United States Patent
Terada et al.

(10) Patent No.: US 9,643,277 B2
(45) Date of Patent: May 9, 2017

(54) ROBOT

(71) Applicant: KABUSHIKI KAISHA YASKAWA DENKI, Kitakyushu-shi (JP)

(72) Inventors: Atsushi Terada, Fukuoka (JP); Kazuhiro Yasutomi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 254 days.

(21) Appl. No.: 14/490,654

(22) Filed: Sep. 18, 2014

(65) Prior Publication Data

US 2015/0076131 A1 Mar. 19, 2015

(30) Foreign Application Priority Data

Sep. 19, 2013 (JP) ................................. 2013-194668
Nov. 1, 2013 (JP) ................................. 2013-228586

(51) Int. Cl.
*B23K 9/00* (2006.01)
*B23K 9/12* (2006.01)
*B23K 9/29* (2006.01)
*B23K 9/133* (2006.01)
(Continued)

(52) U.S. Cl.
CPC .............. *B23K 9/295* (2013.01); *B23K 9/133* (2013.01); *B25J 17/0283* (2013.01); *B25J 19/00* (2013.01); *B25J 19/0025* (2013.01); *Y10S 901/14* (2013.01); *Y10S 901/27* (2013.01); *Y10S 901/39* (2013.01); *Y10S 901/42* (2013.01)

(58) Field of Classification Search
CPC ...... B23K 9/133; B23K 9/295; B25J 17/0283; B25J 19/00; B25J 19/0025; Y10S 901/14; Y10S 901/27; Y10S 901/39; Y10S 901/42

USPC ............................................ 219/136–137.63
See application file for complete search history.

(56) References Cited

U.S. PATENT DOCUMENTS

| 4,757,180 | A | | 7/1988 | Kainz et al. | |
|---|---|---|---|---|---|
| 5,115,690 | A | * | 5/1992 | Torii | B25J 9/047 74/490.02 |
| 5,564,312 | A | * | 10/1996 | Brunman | B25J 19/0029 414/918 |
| 6,795,750 | B2 | * | 9/2004 | Kullborg | B25J 17/0283 700/245 |

(Continued)

FOREIGN PATENT DOCUMENTS

| CN | 1733436 | | 2/2006 |
|---|---|---|---|
| DE | 29720048 | U1 | 3/1999 |

(Continued)

OTHER PUBLICATIONS

Japanese. Office Action for corresponding JP Application No. 2013-228586, Oct. 6, 2015.

(Continued)

*Primary Examiner* — Sang Y Paik
(74) *Attorney, Agent, or Firm* — Mori & Ward, LLP

(57) ABSTRACT

A robot according to an embodiment includes a flange, a wrist arm, a forearm, a feeder, and a power cable. The flange configured so that a welding torch is attached thereto and configured to rotate about a T axis. The wrist arm configured to rotate about a B axis substantially perpendicular to the T axis and configured to support the flange. The forearm configured to support the wrist arm. The feeder attached to a position between a base end and a tip end of the forearm and configured to feed a welding wire. The power cable is a supply route of electricity to the welding torch and is provided separately from a feeding route of the welding wire.

7 Claims, 11 Drawing Sheets

(51) Int. Cl.
   *B25J 17/02*     (2006.01)
   *B25J 19/00*     (2006.01)

(56)             References Cited

U.S. PATENT DOCUMENTS

2004/0261562 A1*  12/2004  Haniya ............... B25J 17/0283
                                                       74/490.02
2006/0101936 A1*   5/2006  Inoue ................ B25J 19/0029
                                                       74/490.01
2009/0242535 A1*  10/2009  Minato ................ B23K 9/133
                                                       219/137.31

FOREIGN PATENT DOCUMENTS

EP          1625920         2/2006
JP          2005-066610     3/2005
JP          2005-297069    10/2005
JP          2006-051581     2/2006
JP          2006-289503    10/2006
JP          2007-326151    12/2007
JP          2009-125885     6/2009
JP          2010-214525     9/2010
WO       WO 02/90034       11/2002

OTHER PUBLICATIONS

Chinese Office Action for corresponding CN Application No. 201410478426.8, Jan. 22, 2016.
Extended European Search Report for corresponding EP Application No. 14185573.4-1712, Feb. 3, 2015.

* cited by examiner

ROBOT

CROSS-REFERENCE TO RELATED APPLICATIONS

This application is based upon and claims the benefit of priority of the prior Japanese Patent Application No. 2013-194668, filed on Sep. 19, 2013; and Japanese Patent Application No. 2013-228586, filed on Nov. 1, 2013, the entire contents of both of which are incorporated herein by reference.

FIELD

The embodiment discussed herein is directed to a robot.

BACKGROUND

Robots applied to arc welding are provided with a welding torch (hereinafter referred to as a "torch"). The torch needs to be fed with a welding wire, and a wire feeding device (hereinafter referred to as a "feeder") as described in Japanese Patent Application Laid-open No. 2005-66610, for example, is used for such feeding.

SUMMARY

A robot according to an embodiment includes a flange, a wrist arm, a forearm, a feeder, and a power cable. The flange configured so that a welding torch is attached thereto and configured to rotate about a T axis. The wrist arm configured to rotate about a B axis substantially perpendicular to the T axis and configured to support the flange. The forearm configured to support the wrist arm. The feeder attached to a position between a base end and a tip end of the forearm and configured to feed a welding wire. The power cable is a supply route of electricity to the welding torch and is provided separately from a feeding route of the welding wire.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

An embodiment of a robot will be described in detail with reference to the accompanying drawings. It should be noted that the embodiment in the following description is not intended to limit the scope of the invention.

An example of a robot applied for arc welding will be described. In the description, a welding torch is referred to as a "torch".

Figure 1A:
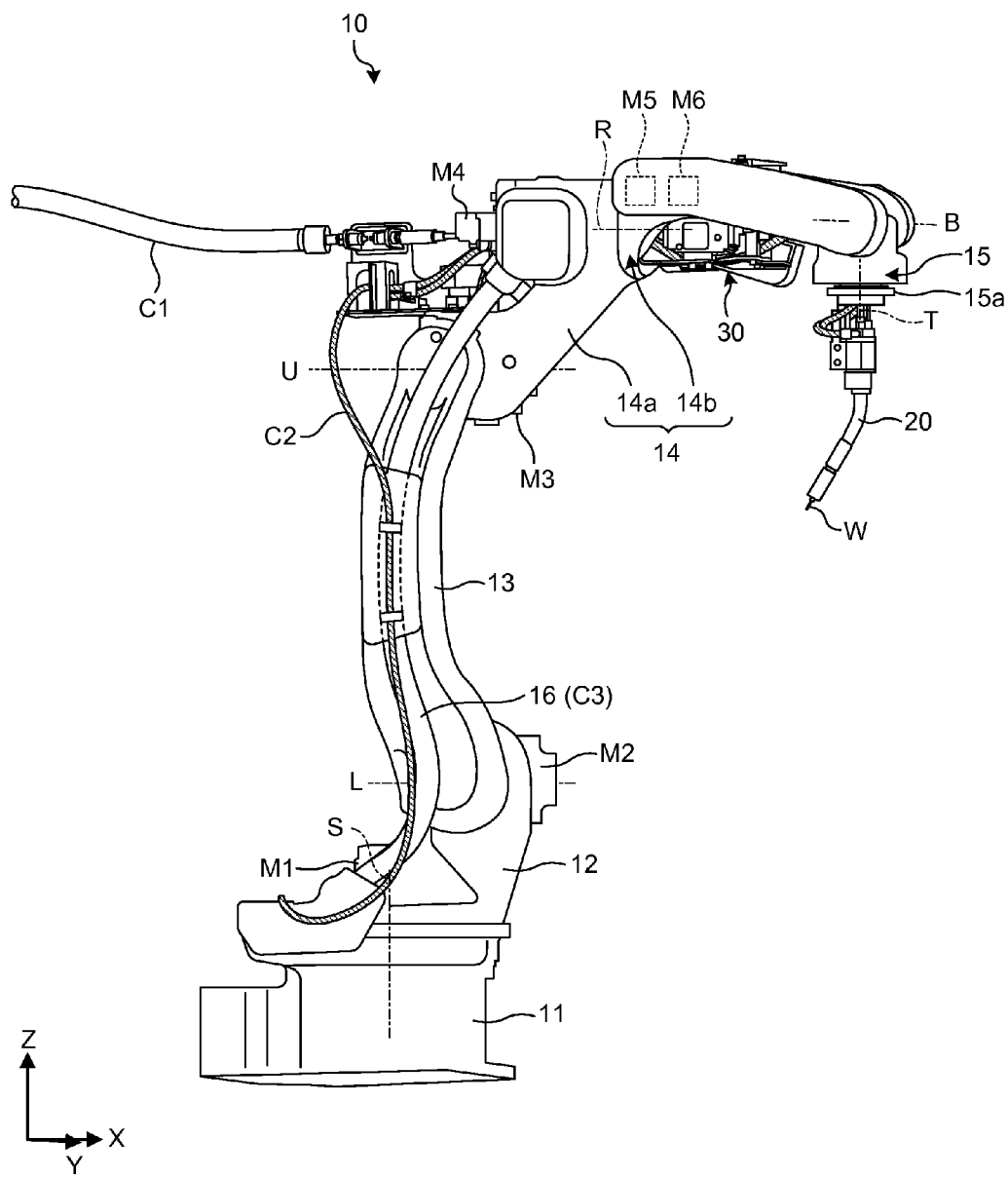
FIG. 1A is a perspective schematic view illustrating a robot according to an embodiment.

A robot 10 according to the embodiment will be generally described. FIG. 1A is a perspective schematic view illustrating the robot 10 according to the embodiment. For convenience sake, the positional relations between parts configuring the robot 10 will be described on the assumption that a pivot position and a posture of the robot 10 are basically kept in the state illustrated in FIG. 1A. The state illustrated in FIG. 1A may be referred to as a "standard posture" of the robot 10.

The installation surface side where a base 11 of the robot 10 is installed is referred to as a "base end side" and the peripheral area in the base end side of each component is referred to as a "base end portion". A flange 15a side of the robot 10 is referred to as a "tip end side" and the peripheral area in the end side of each component is referred to as a "tip end portion".

For easier comprehension, FIG. 1A illustrates a rectangular coordinate system in three dimensions that includes a Z-axis having the vertical upward direction as a positive direction. This rectangular coordinate system may be indicated also in other drawings referred to in the following description. In the embodiment, the positive direction of the X-axis indicates the front of the robot 10.

As FIG. 1A illustrates, the robot 10 is what is called a serial-link vertical-articulated robot that has six axes of rotary joint, which are an S axis, an L axis, a U axis, a R axis, a B axis, and a T axis. The robot 10 also has six servomotors M1, M2, M3, M4, M5, and M6. The robot 10 further includes the base 11, a pivot base 12, a lower arm 13, an upper arm 14, a wrist arm 15, a pipe 16, and a feeder 30.

The upper arm 14 consists of a first arm 14a and a forearm 14b.

Figure 1B:
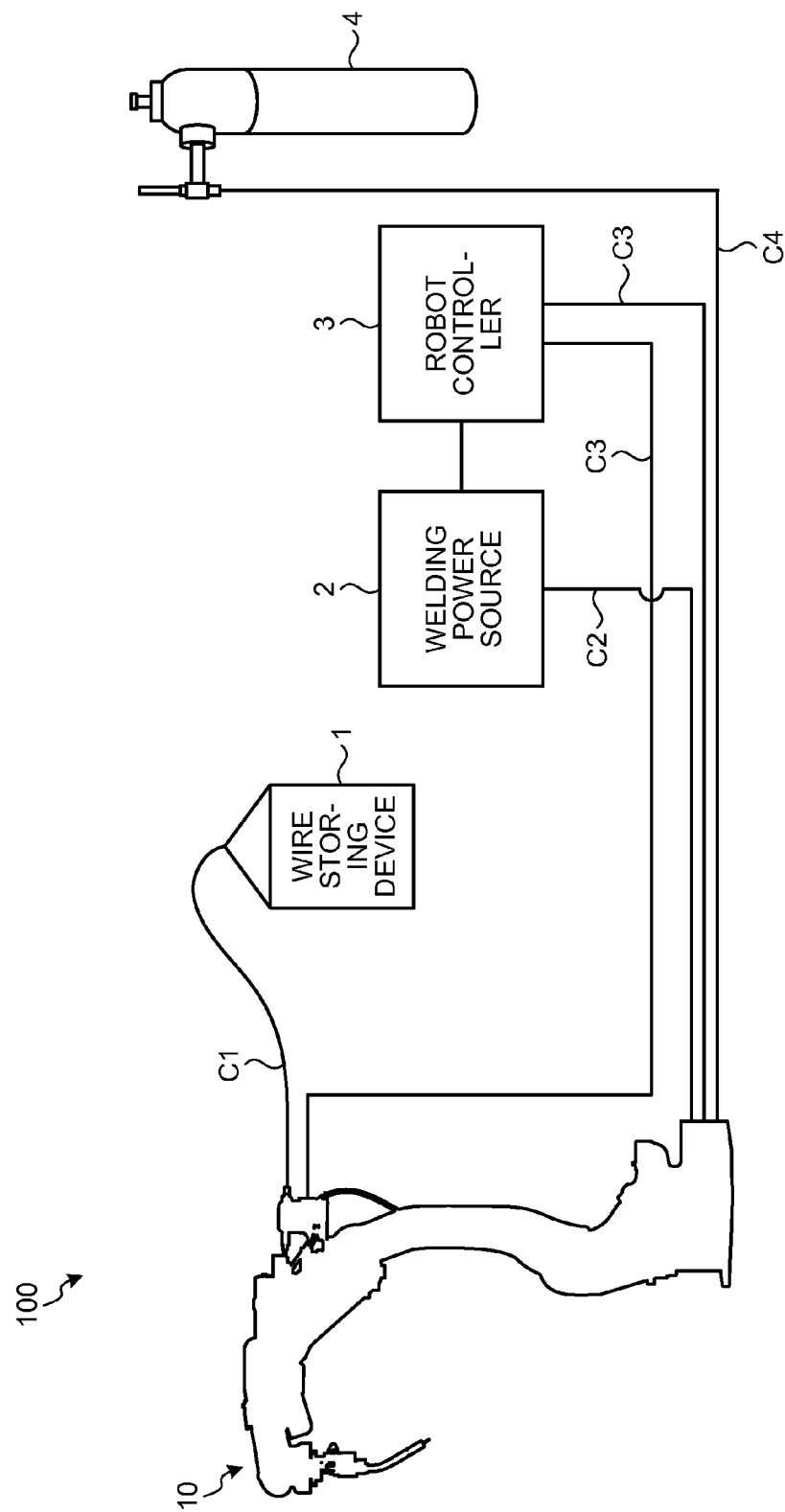
FIG. 1B is a schematic view illustrating an example of the configuration of an arc welding system.

An arc welding system 100 including the robot 10 is now be described. FIG. 1B is a schematic view illustrating an example of the configuration of the arc welding system 100. In FIG. 1B, each component is simplified for illustration. As FIG. 1B illustrates, the arc welding system 100 includes a wire storing device 1, a welding power source 2, a robot controller 3, a gas cylinder 4, and the robot 10.

The wire storing device 1 is a supply source of a wire (welding wire) W and includes a wire reel and others. The welding power source 2 is a power supply device for arc welding. The robot controller 3 is connected to various devices including the robot 10 and the welding power source 2 in an information-transmittable manner and controls operations of those devices.

The robot controller 3 controls, for example, rotation positions of the servomotors M1 to M6, which drive respective axes of rotary joint described as above, thereby varying welding postures of the robot 10. The gas cylinder 4 is a supply source of gas used as shielding gas.

The robot 10 is connected with the wire storing device 1 through a conduit cable C1. The conduit cable C1 includes a wire cable 41, which will be later described. The robot 10 is connected with the welding power source 2 through a welding power source cable C2, connected with the robot controller 3 through a servomotor cable C3, and connected with the gas cylinder 4 through a gas hose C4.

Description is back to FIG. 1A. The conduit cable C1 and the welding power source cable C2 are connected to the outside of the base end portion of the upper arm 14. The welding power source cable C2 is routed along the lower arm 13. The servomotor cable C3 is routed inside the pipe 16 and other components and connected to the servomotors M1 to M6. The gas hose C4 (not illustrated) is routed, for example, along the lower arm 13 and guided toward the upper arm 14.

The conduit cable C1 corresponds to a wire cable 41, which will be later described. The welding power source cable C2 diverges outside the base end portion of the upper arm 14 and is routed as a power cable 43 in the later description. The gas hose C4 corresponds to a gas hose 42, which will be later described.

The base 11 is a support base fixed to a floor and the like (installation object) and rotatably supports the pivot base 12 about the S axis. When the servomotor M1 is driven, the base 11 and the pivot base 12 relatively rotate with respect to each other about the S axis. The pivot base 12 rotatably supports the base end portion of the lower arm 13 about the L axis perpendicular to the S axis. When the servomotor M2 is driven, the pivot base 12 and the lower arm 13 relatively rotate with respect to each other about the L axis.

The lower arm 13 rotatably supports, at its tip end portion, the base end portion of the first arm 14a of the upper arm 14 about the U axis parallel to the L axis. When the servomotor M3 is driven, the lower arm 13 and the first arm 14a relatively rotate with respect to each other about the U axis. The first arm 14a rotatably supports, at its tip end portion, the base end portion of the forearm 14b about the R axis perpendicular to the U axis. When the servomotor M4 is driven, the first arm 14a and the forearm 14b relatively rotate with respect to each other about the R axis.

The forearm 14b rotatably supports, at its tip end portion, the base end portion of the wrist arm 15 about the B axis perpendicular to the R axis. When the servomotor M5 is driven, power is transmitted via a power transmission mechanism (such as a belt and a pulley) incorporated in the forearm 14b, whereby the forearm 14b and the wrist arm 15 relatively rotate with respect to each other about the B axis.

The wrist arm 15 is provided with a torch 20. The wrist arm 15 has a flange 15a rotatable about the T axis perpendicular to the B axis and is provided with the torch 20 with the flange 15a interposed therebetween. When the servomotor M6 is driven, power is transmitted via a power transmission mechanism (such as a belt and a pulley) incorporated in the forearm 14b, whereby the flange 15a rotates about the T axis.

Mathematical accuracy is not necessarily required in the above-described words "perpendicular", "parallel", and the like, which allow substantial tolerances and differences. The word "perpendicular" in the embodiment does not always mean that two lines (axes) are orthogonal to each other on an identical plane but includes the case where two lines (axes) are in positional relations of torsion.

The feeder 30 intersects with the R axis between the base end portion and the tip end portion of the forearm 14b and feeds the torch 20 with the wire W.

Figure 2:
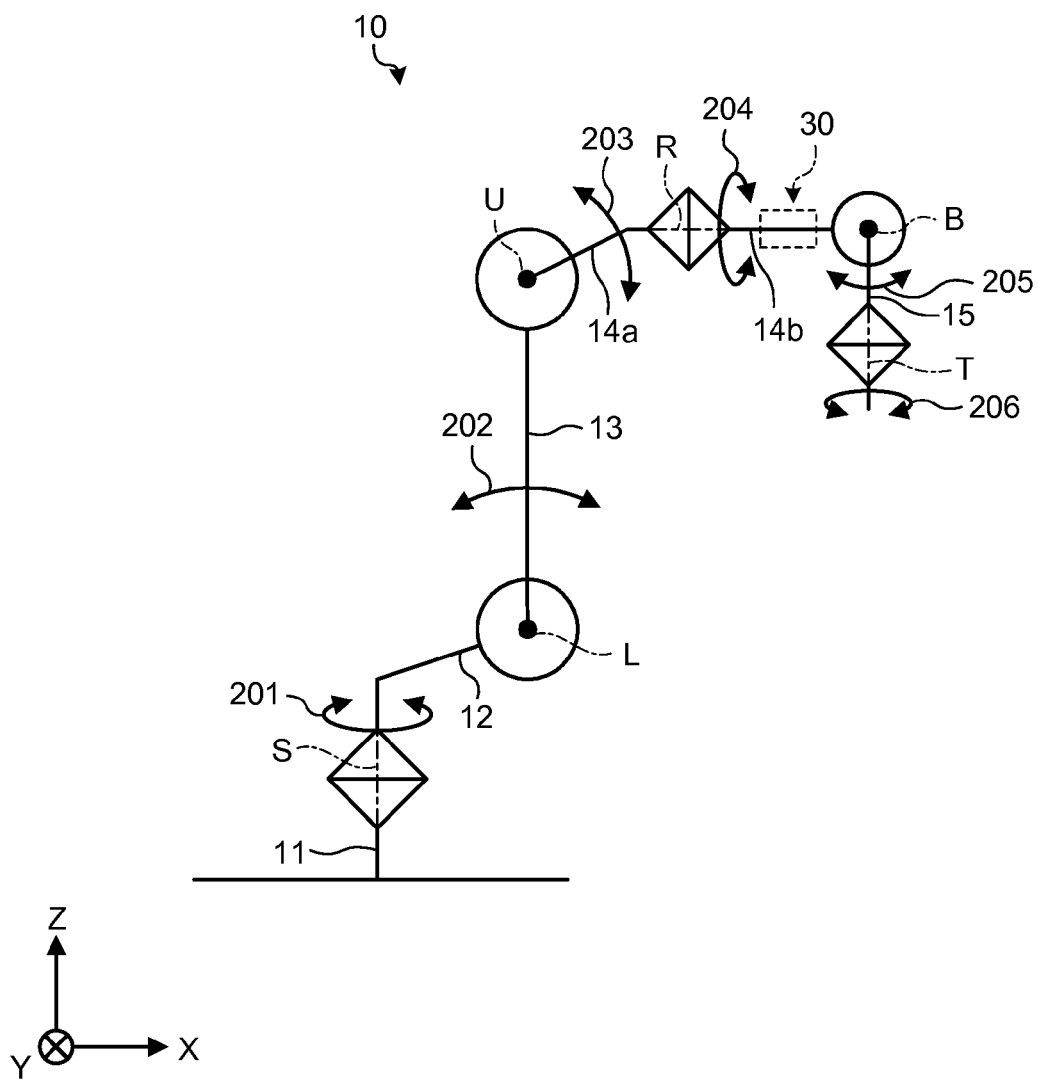
FIG. 2 is a schematic view illustrating an operation of each axis of the robot and the position of a feeder.

For more comprehensible description, FIG. 2 schematically illustrates an operation of each axis of the robot 10 and the position of the feeder 30. FIG. 2 is a schematic view illustrating an operation of each axis of the robot 10 and the position of the feeder 30. In FIG. 2, the robot 10 viewed from the right lateral direction (the negative direction of the Y-axis) is quite schematically illustrated with graphic symbols indicating joints and the like.

As FIG. 2 illustrates, the pivot base 12 pivots about the S axis (see the arrow 201 in FIG. 2) with support of the base 11. The lower arm 13 swings back and forth about the L axis (see the arrow 202 in FIG. 2) with support of the pivot base 12.

The first arm 14a swings upward and downward about the U axis (see the arrow 203 in FIG. 2) with support of the lower arm 13. The forearm 14b rotates about the R axis (see the arrow 204 in FIG. 2) with support of the first arm 14a.

The feeder 30 is disposed in a manner of intersecting with the R axis between the base end portion and the tip end portion of the forearm 14b (see the rectangle in a dashed line in FIG. 2).

The wrist arm 15 swings about the B axis (see the arrow 205 in FIG. 2) with support of the forearm 14b. The tip end portion (the above-described flange 15a) of the wrist arm 15 rotates about the T axis (see the arrow 206 in FIG. 2).

As described above, the feeder 30 is disposed in a manner of intersecting with the R axis between the base end portion and the tip end portion of the forearm 14b, thereby preventing the feeder 30 from interfering with the workpiece, jigs, peripherals, and the like.

Figure 3A:
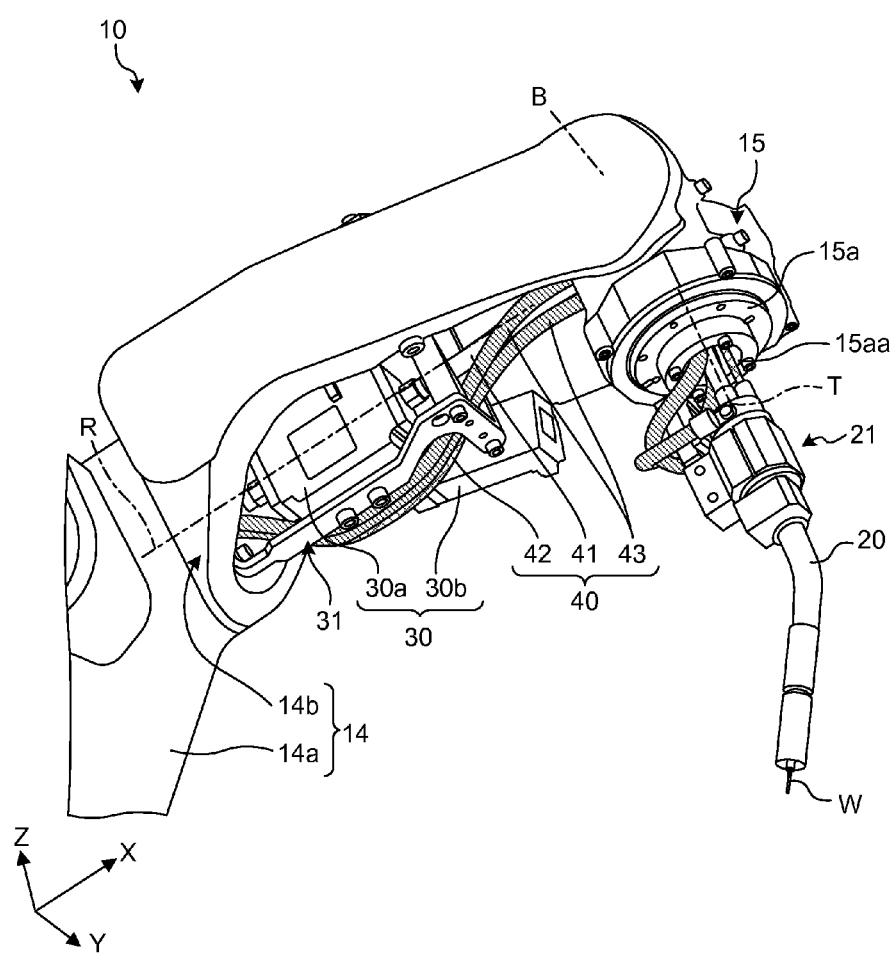
FIG. 3A is a perspective schematic view illustrating the periphery of an upper arm.

The constructional arrangement of the feeder 30 is described in detail with reference to FIG. 3A. FIG. 3A is a perspective schematic view illustrating the periphery of the upper arm 14.

As already described and as illustrated in FIG. 3A, the feeder 30 is disposed in a manner of intersecting with the R axis between the base end portion and the tip end portion of the forearm 14b. The feeder 30 draws the wire W from the wire storing device 1 (see FIG. 1B) and feeds the torch 20 with the wire W.

The feeder 30 consists of a body 30a and a driving source 30b, which are supported by the forearm 14b with a support 31. The configuration of the support 31 will be later described with reference to FIG. 3B.

The body 30a includes therein a feeding mechanism (not illustrated) for the wire W that includes a feeding roller and others. The feeding mechanism is driven by the driving source 30b.

The body 30a is connected with a wire cable 41 serving as a feeding route of the wire W. The wire cable 41 is routed along the R axis.

Furthermore, the gas hose 42 serving as a supply route of gas to the torch 20 and the power cable 43 for supplying electricity as supply routes of electricity to the torch 20 are provided separately from the wire cable 41 and routed. These cables, which consist of the wire cable 41, the gas hose 42, and the power cable 43, are flexible.

It is preferable that the power cable 43 diverge into several cables. In the embodiment, the power cable 43 diverges into two cables as FIG. 3A illustrates. The wire cable 41, the gas hose 42, and the power cable 43 may be hereinafter collectively referred to as "cables 40".

These cables 40 are routed in a state of being bound with the support 31, inserted into a pass opening 15aa passing through the wrist arm 15, and connected to the torch 20. The torch 20 is fixed to the flange 15a with a torch clamp 21 interposed therebetween. How to route the cables 40 will be later described in detail with reference to FIG. 3B and the subsequent drawings.

The constructional arrangement of the feeder 30 is described in more detail along with the specific configuration of the forearm 14b with reference to FIGS. 3B to 3G.

Figure 3B:
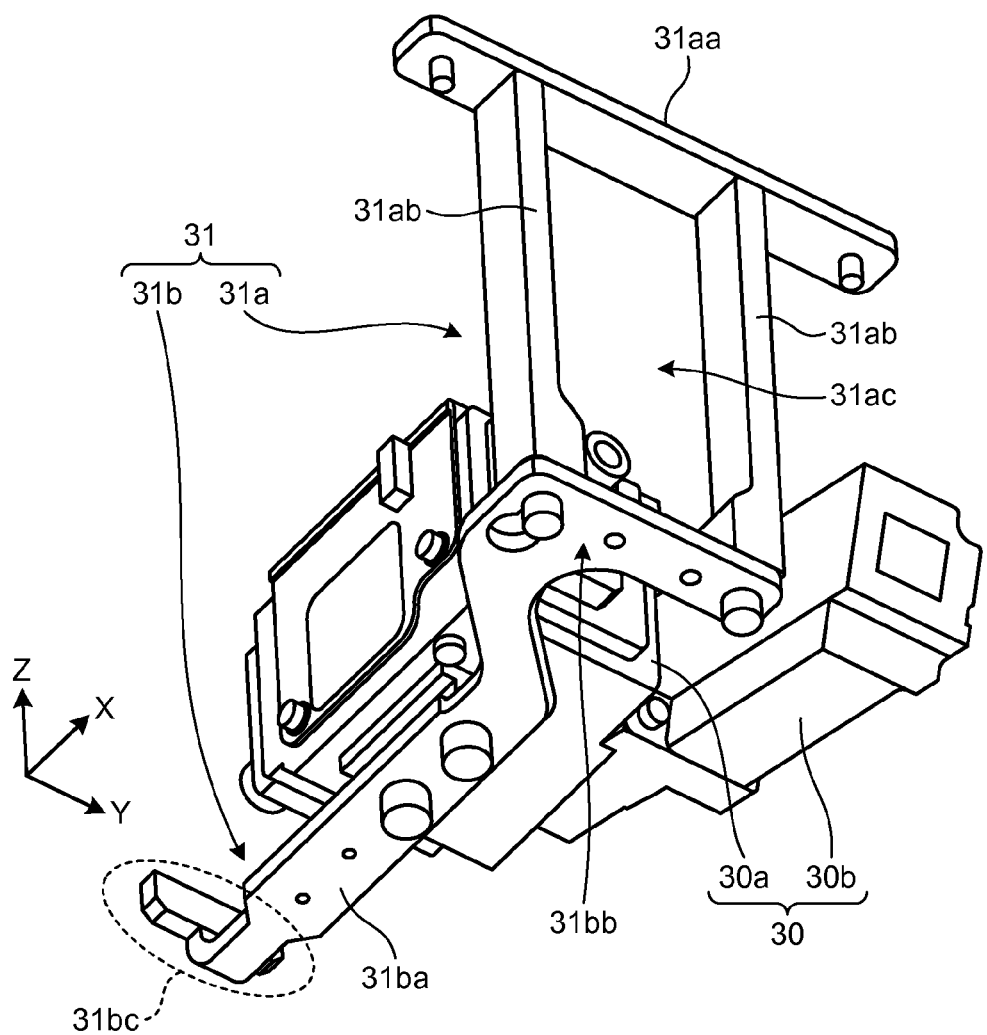
FIG. 3B is a perspective schematic view illustrating the configuration of a support.
Figure 3C:
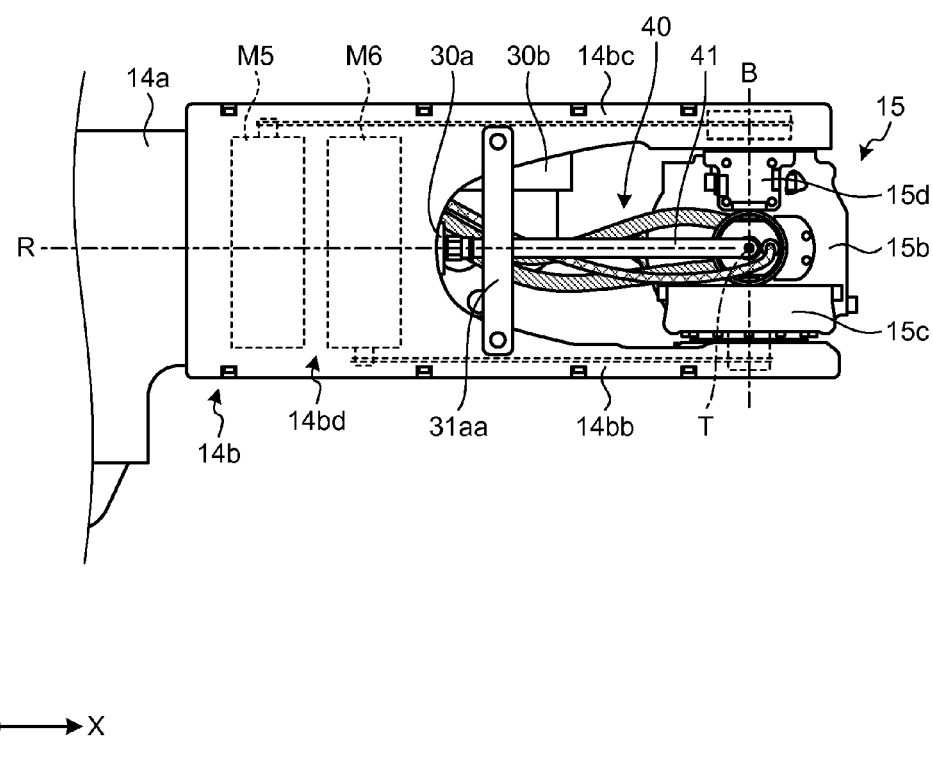
FIG. 3C is a planar schematic view illustrating the periphery of the upper arm.
Figure 3D:
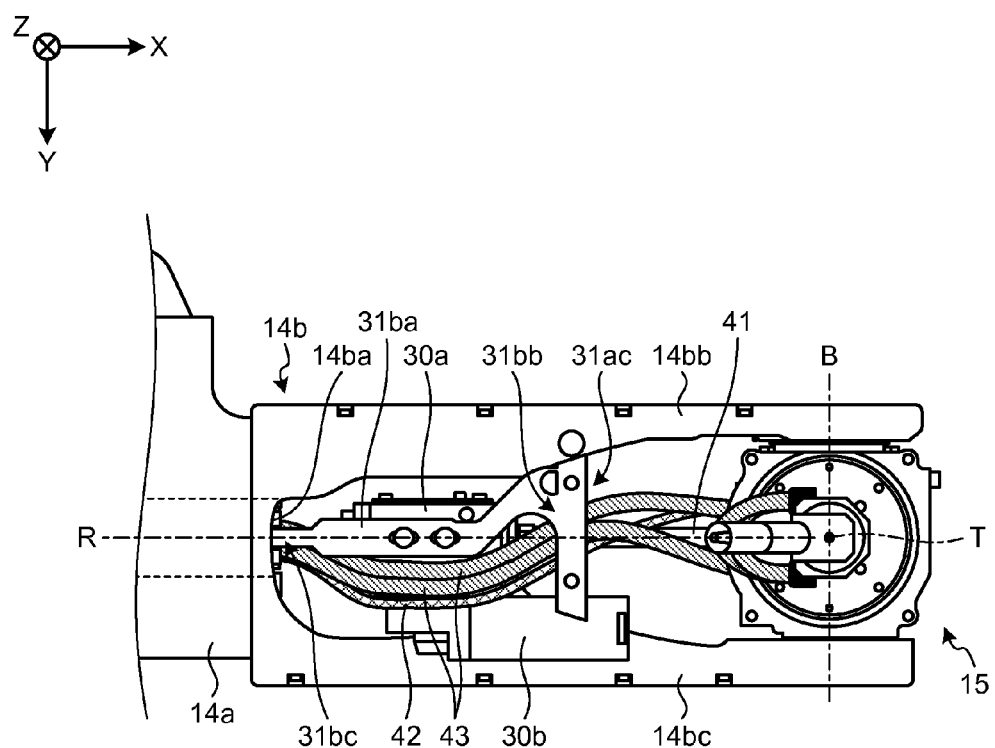
FIG. 3D is a bottom schematic view illustrating the periphery of the upper arm.

FIG. 3B is a perspective schematic view illustrating the configuration of the support 31. FIG. 3C is a planar schematic view illustrating the periphery of the upper arm 14. FIG. 3D is a bottom schematic view illustrating the periphery of the upper arm 14.

Figure 3E:
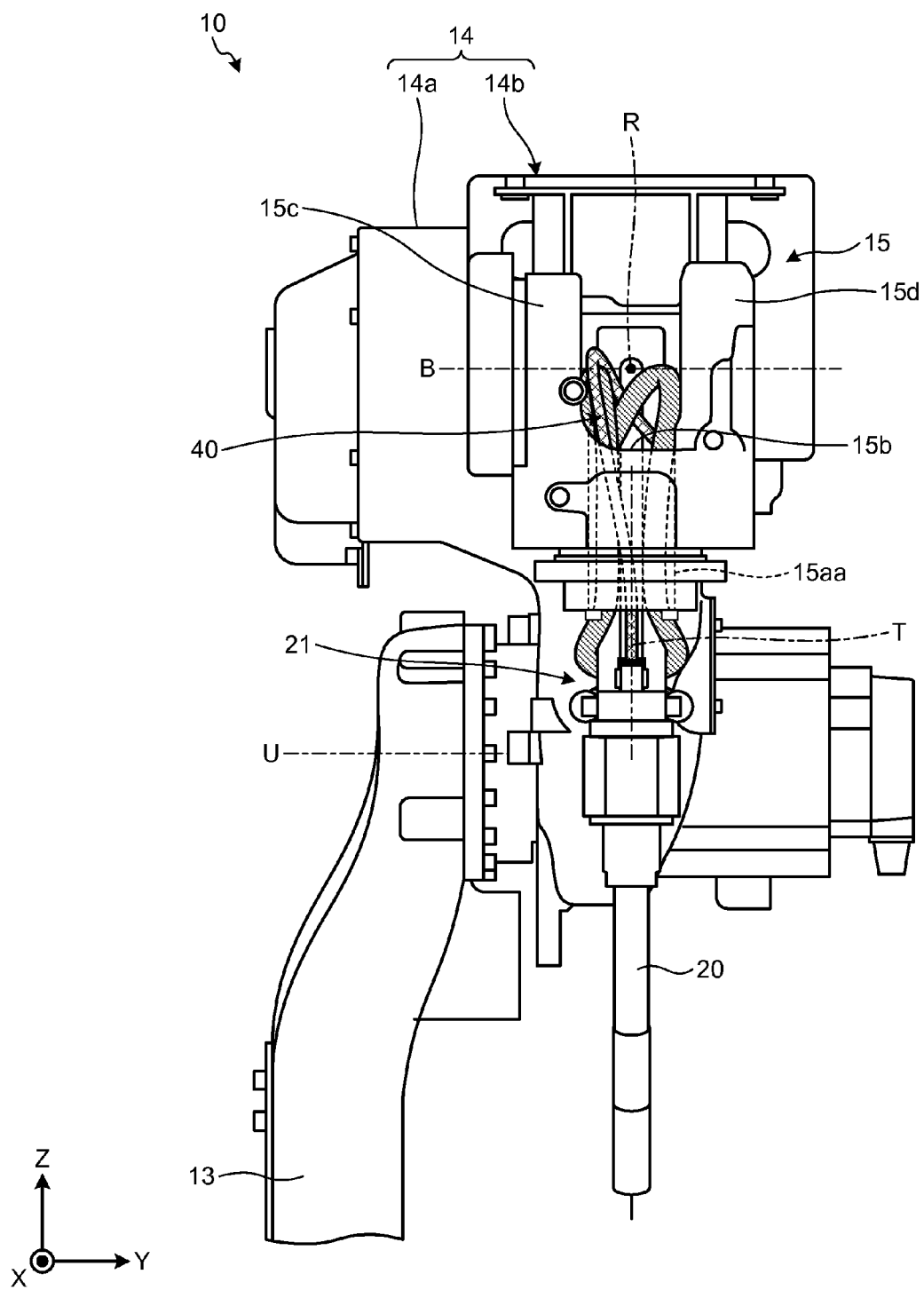
FIG. 3E is a front schematic view illustrating the periphery of the upper arm.
Figure 3F:
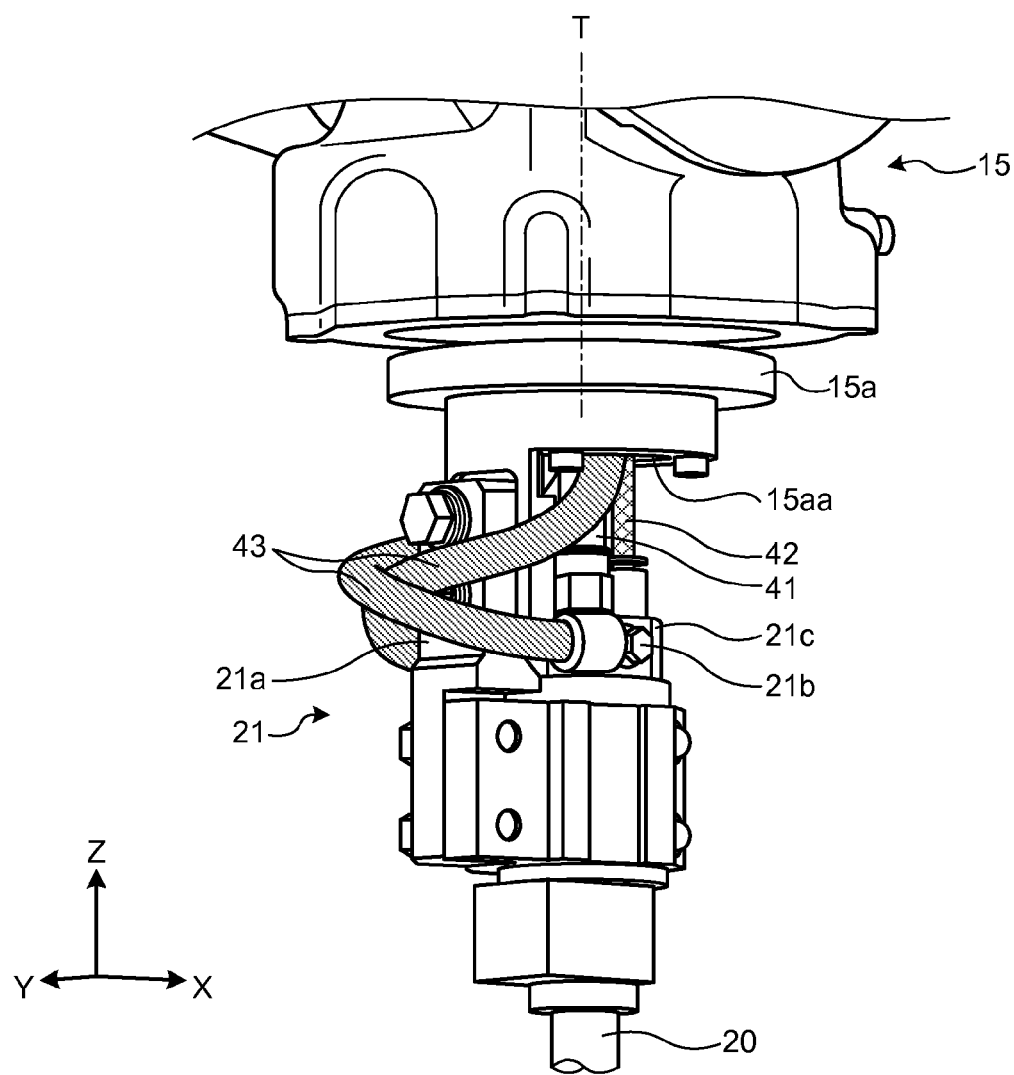
FIG. 3F is a perspective schematic view illustrating the periphery of a torch clamp.
Figure 3G:
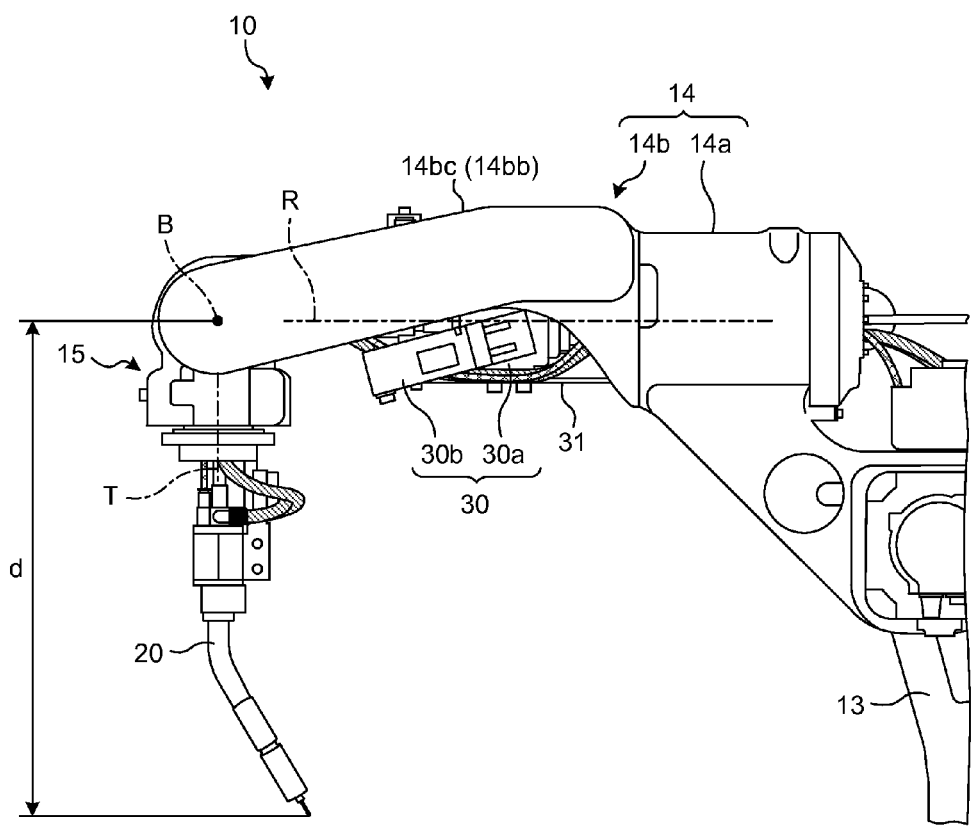
FIG. 3G is schematic view illustrating the periphery of the upper arm viewed from its left side.
Figure 3G:
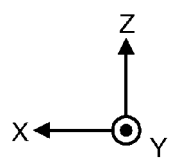

FIG. 3E is a front schematic view illustrating the periphery of the upper arm 14. FIG. 3F is a perspective schematic view illustrating the periphery of the torch clamp 21. FIG. 3G is a schematic view illustrating the periphery of the upper arm 14 viewed from its left side.

The configuration of the support 31 is now described in detail. As FIG. 3B illustrates, the support 31 consists of a first frame 31a and a second frame 31b.

The first frame 31a has a suspension 31aa extending in the Y-axis direction in FIG. 3B and two pillars 31ab extending in the Z-axis direction substantially perpendicular to the suspension 31aa.

The second frame 31b has a shank portion 31ba extending in the X-axis direction in FIG. 3B, a hook portion 31bb extending from the shank portion 31ba in the Y-axis direction while forming the shape of a hook, and a tail portion 31bc formed at the opposite end of the shank portion 31ba to the hook portion 31bb.

The feeder 30 is fixed to the second frame 31b with the body 30a fixed to the shank portion 31ba with a fastener member or the like. The second frame 31b is joined with the first frame 31a with the hook portion 31bb connected to the respective ends of the pillars 31ab.

With the joining of the first frame 31a and the second frame 31b, an insertion path 31ac is formed, which is a space surrounded by the suspension 31aa, the pillars 31ab, and the hook portion 31bb.

The feeder 30 is provided to the forearm 14b with the support 31 configured in the above-described manner interposed therebetween as FIGS. 3C and 3D illustrate.

As FIGS. 3C and 3D illustrate, the forearm 14b has a bottom 14ba (see FIG. 3D), a first extending portion 14bb extending from the bottom 14ba along the R axis, and a second extending portion 14bc disposed parallel to the first extending portion 14bb with a space therebetween. The forearm 14b is formed in a bifurcated shape.

The first extending portion 14bb and the second extending portion 14bc support the wrist arm 15 at the respective end portions. In the upper side (the positive direction side of the Z-axis in FIGS. 3C and 3D) of the feeder 30 (the body 30a and the driving source 30b), an accommodation portion 14bd (see FIG. 3C) that accommodates therein the servomotors M5 and M6 is formed.

The feeder 30 is disposed at an area closer to the base of the bifurcated portions of the forearm 14b and between the bifurcated portions. The area closer to the base specifically indicates the area close to the bottom 14ba serving as a mating portion of the first extending portion 14bb and the second extending portion 14bc.

The feeder 30 is fixed to the forearm 14b with the suspension 31aa suspended over the first extending portion 14bb and the second extending portion 14bc, with the ends of the suspension 31aa fixed with a fastener member or the like (see FIG. 3C), and with the tail portion 31bc fixed to the bottom 14ba (see FIG. 3D).

This configuration secures certain distances between a movable portion about the B axis and the feeder 30 and between a movable portion about the T axis and the feeder 30, whereby the feeder 30 is less likely to be affected by such movable portions.

In specific, this configuration can prevent bending and even buckling of the wire cable 41 caused by the large compression force, which is generated between the wrist arm 15 and the feeder 30 due to a swing of the wrist arm 15 or generated between the flange 15a and the feeder 30 due to rotation of the flange 15a. This thus can eliminate disturbances in the feeding operation of the wire W.

The feeder 30 is at least disposed at an area between the bifurcated portions of the forearm 14b, which is not much far from the torch 20. This can make it possible to lower the resistance to feeding of the wire W compared with such a case where the feeder 30 is disposed behind the base end portion (the negative direction side of the X-axis in FIGS. 3C and 3D) of the upper arm 14.

The configuration capable of feeding the wire W both in the forward and backward directions during welding is thus applicable to the feeder 30. This makes the feeding operation of the wire W more responsive while preventing interference of the feeder 30.

As FIGS. 3C and 3D illustrate, the wire cable 41 is routed along the R axis between the bifurcated portions of the forearm 14b. This prevents disorderly movement of the wire cable 41 resulting from rotation of the forearm 14b about the R axis and accordingly eliminates disturbances in the feeding operation of the wire W.

A method for routing the cables 40 including the wire cable 41 is now described. As FIG. 3D illustrates, in the cables 40 inserted in the hollow portion inside the first arm 14a and routed therethrough from the first arm 14a side, the wire cable 41 is routed along the R axis as described above.

The gas hose 42 and the power cables 43 are bound together and routed between the body 30a and the driving source 30b in the lower side (the negative direction side of the Z-axis in FIG. 3D) of the feeder 30 while avoiding the shank portion 31ba.

The gas hose 42 and the power cables 43 are thereafter guided in the direction of the insertion path 31ac while passing through the underarm (the inside) of the hook portion 31bb, inserted in the insertion path 31ac together with the wire cable 41, and routed toward the wrist arm 15.

Routing the cables 40 in this manner eliminates disturbances in the feeding operation of the wire W and prevents disconnection of the cables 40 caused by large compression force applied thereon.

In particular, load on the cables is distributed with the power cable 43, which is usually large and less flexible, arranged separately from the wire cable 41 and formed in a bifurcated shape as in the embodiment. Buckling or disconnection of the cables 40 thus less occurs even if large compression force resulting from, for example, swing of the wrist arm 15 is applied on the cables 40.

Furthermore, use of the hook portion 31bb of the support 31 in the above-described manner in routing the cables 40 can prevent the cables 40 from interfering with the first extending portion 14bb and the second extending portion 14bc and thus can prevent the cables 40 from being affected by unnecessary force.

The configuration of the wrist arm 15 is now described. As FIG. 3C illustrates, the wrist arm 15 has a bottom 15b, a first portion 15c extending from the bottom 15b along the T axis, and a second portion 15d disposed parallel to the first portion 15c with a space formed therebetween. The wrist arm 15 is formed in a bifurcated shape that is substantially a U-shape in the front view.

As FIG. 3E illustrates, the cables 40 including the wire cable 41 routed along the R axis from the feeder 30 are inserted into the pass opening 15aa while being routed between the bifurcated portions of the wrist arm 15, and connected to the torch 20 through the torch clamp 21.

How the cables 40 are routed in the torch clamp 21 and connected to the torch 20 is now described. As FIG. 3F illustrates, the torch clamp 21 includes a support pillar 21a, a terminal 21b, and a merging portion 21c.

The support pillar 21a extends in a pillar shape from a portion attached to the flange 15a toward the torch 20 and serves as a support pillar of the torch clamp 21. The terminal 21b is a connecting terminal for the power cable 43 and is provided at the side edge of the merging portion 21c, which will be later described.

The merging portion 21c merges the wire cable 41, the gas hose 42, and the power cable 43 together and guides them to the torch 20. In the merging portion 21c, respective connecting portions (not illustrated) for the wire cable 41 and the gas hose 42 are provided on the side facing the pass opening 15aa.

As FIG. 3F illustrates, the wire cable 41 and the gas hose 42 passing through the pass opening 15aa from the wrist arm 15 side are connected to the merging portion 21c through the above-described connecting portions from the Z-axis direction in FIG. 3F. The power cables 43 coming down from the pass opening 15aa are diverted outside the support pillar 21a and hung on the support pillar 21a in a cross shape (in an obliquely-crossed manner with each other).

The power cable 43 is thereafter connected to the merging portion 21c with the terminal 21b interposed therebetween from the direction substantially perpendicular to the T axis (see the X-axis direction in FIG. 3F). This configuration reduces shear force and the like caused on the terminal 21b by the power cable 43 moving with rotation of the flange 15a about the T axis.

In other words, the configuration can eliminate excessive stress caused on the terminal 21b by the power cable 43, which is larger and less flexible compared with the wire cable 41 and the gas hose 42. The configuration can eliminate also excessive stress concentrating on the power cable 43 itself. Consequently, the robot 10 can easily take various welding postures. Furthermore, interference of the power cables 43 with the surrounding components is prevented by bundling loose power cables 43.

Positioning of the driving source 30b of the feeder 30 is now described. As FIG. 3G illustrates, the driving source 30b of the feeder 30 is configured such that the driving source 30b protrudes outside the bifurcated portions of the forearm 14b.

Specifically, the driving source 30b protrudes downward (the negative direction side of the Z-axis in FIG. 3G) from a space between the first extending portion 14bb and the second extending portion 14bc when the robot 10 is in the standard posture (see FIG. 1A). It is, however, possible to configure the driving source 30b of the feeder 30 such that the driving source 30b does not protrude from the space between the first extending portion 14bb and the second extending portion 14bc, depending on the shape and the kind of the driving source 30b.

With the driving source 30b protruding from the space between the bifurcated portions of the forearm 14b, the gas hose 42 and the power cable 43, which are routed through the support 31 and others as described above, also protrude, at least partly, from the space between the bifurcated portions of the forearm 14b.

This facilitates replacement, maintenance, and other operations of at least the driving source 30b and also facilitates rerouting of the cables 40. In other words, the configuration increases maintainability of the feeder 30 and the periphery of the cables 40.

The following is summarized description of advantageous effects exerted by the constructional arrangement of the feeder 30 and the method for routing the cables 40 in the embodiment as described earlier. A comparative example of a constructional arrangement is firstly described. In the description, like numerals indicate like members that share the same function between the comparative example and the embodiment.

In the comparative technique, the feeder 30 is provided at the tip of the wrist arm 15 to make the feeding operation of the wire W more responsive. In this case, the feeder 30 is disposed between the wrist arm 15 and the torch 20.

Such a configuration in the comparative technique often increases the distance (corresponding to the distance d in FIG. 3G) from the B axis to the tip of the torch 20 and thus restricts welding postures that the robot 10 can take. Even if the robot 10 can take a required welding posture, the robot 10 needs to make unnecessarily large motion to take the posture.

With the constructional arrangement of the feeder 30 according to the embodiment, the distance d from the B axis to the tip of the torch 20 in FIG. 3G is shortened. This enables the robot 10 to easily take various welding postures which have been conventionally unadaptable.

Furthermore, the robot 10 can take welding postures without making unnecessarily large motion, thereby shortening the operation time of the robot 10. In other words, it is possible to shorten the time for working processes.

As FIG. 3G illustrates, the feeder 30 is disposed between the bifurcated portions of the forearm 14b. This prevents interference of the feeder 30 and reduces, for example, the number of spatters adhering thereto. Damage, failure, and other disadvantages of the feeder 30 are accordingly prevented.

Figure 4:
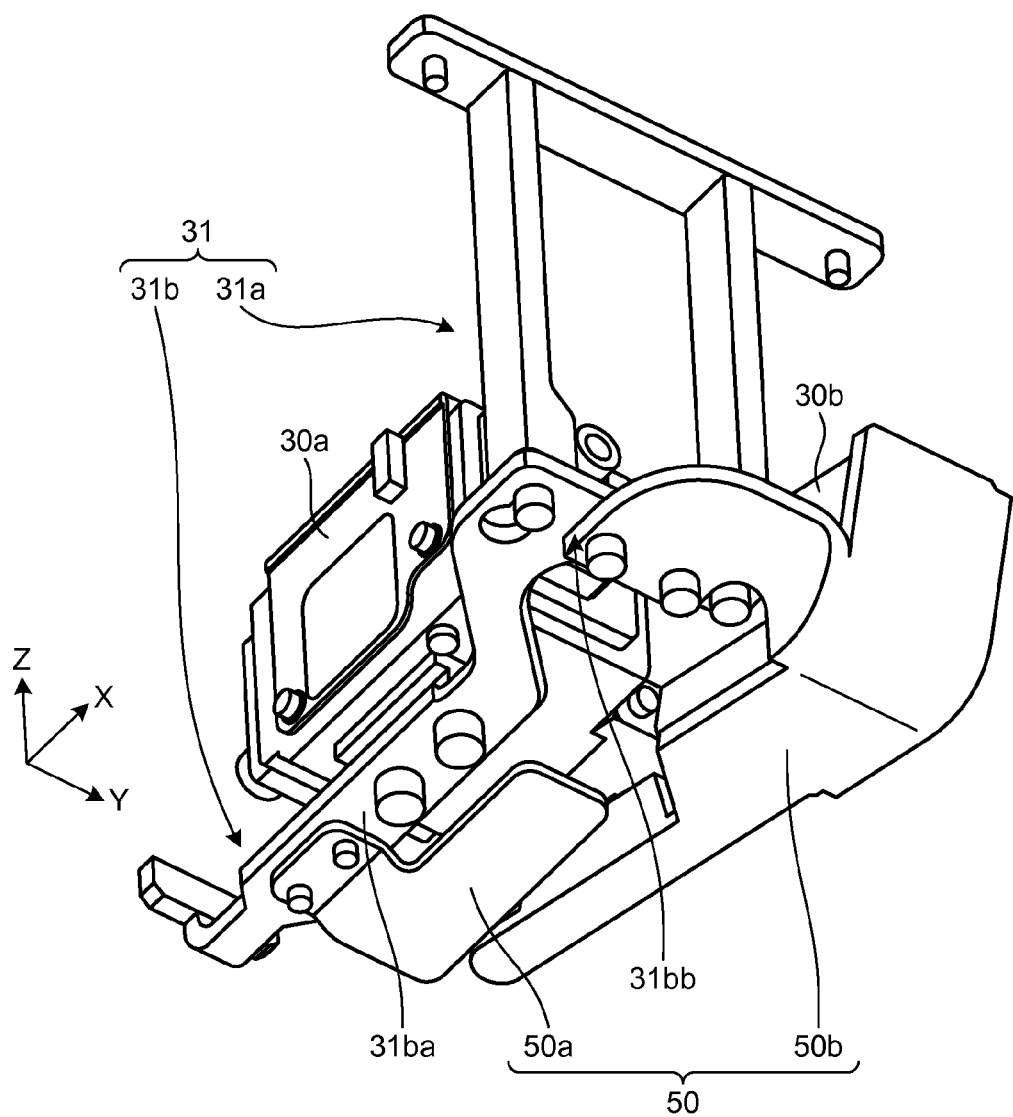
FIG. 4 is a perspective schematic view illustrating the configuration of a support according to a modification.

In this point, the support 31 may be covered with a covering member as FIG. 4 illustrates as a modification. FIG. 4 is a perspective schematic view illustrating the configuration of the support 31 according to the modification.

As FIG. 4 illustrates, the support 31 may include a covering member 50 consisting of a first cover 50a and a second cover 50b.

The first cover 50a is disposed, for example, on the downside (the negative direction side of the Z-axis in FIG. 4) of the body 30a of the feeder 30 in a manner fixed to the shank portion 31ba. This prevents spatters and the like from adhering to the body 30a from below.

The second cover 50b is disposed, for example, on the downside (the negative direction side of the Z-axis in FIG. 4) of the driving source 30b of the feeder 30 in a manner fixed to the hook portion 31bb. This prevents spatters and the like from adhering to the driving source 30b at least from below.

Description is now back to FIG. 3G. As FIG. 3G illustrates, the feeder 30 is disposed at an area between the bifurcated portions of the forearm 14b and closer to the base of the bifurcated portions. With this, such problems less occurs that the feeding operation of the wire W is disturbed by bending or the like of the wire cable 41 and that responsiveness of the feeding operation of the wire W is damaged.

This configuration thus enables the robot 10 to perform the welding operation with higher quality. Furthermore, as described above, use of the feeder 30 capable of feeding the wire W both in the forward and backward directions also exerts advantageous effects for a higher-quality welding operation.

As FIG. 3A and others illustrate, the gas hose 42 and the power cable 43 are provided separately from the wire cable 41. With this, the feeding operation of the wire W is less disturbed, and load on the cables 40 caused by operating the robot 10 is easily distributed.

This configuration prevents buckling and disconnection of the cables 40 and in other words, enables the robot 10 to easily take various welding postures.

The power cable 43 diverges into several cables. The cables are, for example, hung on the torch clamp 21 in a cross shape and connected to the merging portion 21c as FIG. 3F illustrates.

This configuration facilitates routing of the power cable 43, which is usually large and less flexible. Furthermore, the configuration prevents concentration of load on the terminal 21b caused by the power cable 43 and prevents damage to the terminal 21b. This accordingly enables the robot 10 to take various welding postures.

As already described, the robot according to the embodiment includes a flange, a wrist arm, a forearm, a feeder, and a power cable. The flange configured so that a welding torch is attached thereto and configured to rotate about a T axis. The wrist arm configured to rotate about a B axis substantially perpendicular to the T axis and configured to support the flange.

The forearm configured to support the wrist arm. The feeder attached to a position between a base end and a tip end of the forearm and configured to feed a welding wire. The power cable is a supply route of electricity to the welding torch and is provided separately from a feeding route of the welding wire.

The robot according to the embodiment can easily take various welding postures without interference.

In the embodiment as described above, a robot used for arc welding is given as an example; however, this is not intended to limit the kind of work performed by the robot. The embodiment is also applicable to such a case that uses a hand, instead of the welding torch, capable of holding a workpiece as an end effector and assembles the workpiece while feeding the hand with a wire-type member using a feeder.

The embodiment is not intended to limit the shape of an arm of the robot. For example, the forearm 14b in the embodiment is not limited to a bifurcated shape. Any shapes capable of swingably supporting the wrist arm 15 are applicable.

A multi-axis robot having a six-axis described in the embodiment is illustrative, and the embodiment is not intended to limit the number of axes. A robot having a seven-axis is also applicable.

A single-arm robot described in the embodiment is illustrative and not limiting example. The embodiment may be applied for at least any one of arms equipped to a multi-arm robot with two or more arms.

In the embodiment as described above, such a configuration that a gas hose and a power cable are each provided separately from a wire cable is given as an example; however, any configurations are applicable as long as at least a power cable is separated from others. For example, such a configuration may be applied that a wire cable and a gas hose are integrated, whereas a power cable is independent.

The power cable diverging into two cables in the embodiment is illustrative, and the number of cables diverging from the power cable is not limited. The number may be three or more. In this case, at least a pair of power cables out of the power cables needs to be suspended in a cross-shape.

In the embodiment as described above, the power cable is suspended in a cross shape and connected to the terminal from the X-axis direction (see FIG. 3F). This arrangement is, however, not limiting, and the cable is not necessarily suspended in a cross shape. For example, the power cable may be diverted in a loosened state instead of being suspended in a cross-shape and connected to the terminal from the X-axis direction. Furthermore, the power cable can be connected to the terminal from a direction other than the X-axis direction as long as the cable is not arranged substantially parallel to the T axis.

The torch clamp 21, the merging portion 21c, and other components may be covered with a covering member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot comprising:
    a flange configured so that a welding torch is attached thereto and configured to rotate about a T axis;
    a wrist arm configured to rotate about a B axis substantially perpendicular to the T axis and configured to support the flange;
    a forearm configured to support the wrist arm;
    a feeder attached to a position between a base end and a tip end of the forearm and configured to feed a welding wire; and
    a power cable that is a supply route of electricity to the welding torch and is provided separately from a feeding route of the welding wire, wherein
    the forearm configured to rotate about a R axis substantially perpendicular to the B axis,
    the forearm is formed in a shape with bifurcated portions in a planar view,
    the feeder is disposed at an area between the bifurcated portions and closer to a base of the bifurcated portions,
    the robot further comprises:
        a wire cable that is a feeding route of the welding wire and is routed along the R axis between the bifurcated portions;
        a first frame having a suspension suspended over the bifurcated portions of the forearm and a pillar substantially perpendicularly extending from the suspension; and
        a second frame having a hook portion formed in a hook shape and connected to the pillar and a tail portion fixed to the base of the bifurcated portions, and
    the feeder intersects with the R axis between the base end portion and the tip end portion of the forearm by being fixed to the second frame.

2. The robot according to claim 1, further comprising:
    an insertion path formed with the pillar and the hook portion connected with each other, wherein
    the power cable is guided toward the insertion path through an inside of the hook portion, inserted into the insertion path together with the wire cable, and routed toward the wrist arm.

3. The robot according to claim 1, wherein the power cable diverges into a plurality of cables.

4. The robot according to claim 3, further comprising:
    a torch clamp that has a portion attached to the wrist arm and a support pillar extending in a pillar shape from the portion to the welding torch and connects the wrist arm and the welding torch via the support pillar, wherein at least a pair of power cables out of the power cables is hung on the support pillar in a cross shape.

5. The robot according to claim 4, wherein the wrist arm rotatably supports the torch clamp about the T axis perpendicular to the B axis;

the torch clamp further includes a merging portion that merges the power cable and the wire cable; and the power cable is routed through the wrist arm along the T axis from the forearm and is connected to the merging portion from a direction substantially perpendicular to the T axis.

6. The robot according to claim 1, further comprising:

a gas hose as a supply route of gas to the welding torch, wherein the power cable, the wire cable, and the gas hose are provided separately from one another.

7. The robot according to claim 1, further comprising:

a base fixed to an installation object;

a pivot base configured to connect to the base rotatably about an S axis substantially perpendicular to an installation surface of the installation object;

a lower arm configured to connect to the pivot base rotatably about an L axis substantially perpendicular to the S axis; and an upper arm configured to be supported on the lower arm rotatably about a U axis substantially parallel to the L axis.

* * * * *